United States Patent
Ohmori

(10) Patent No.: US 10,411,282 B2
(45) Date of Patent: Sep. 10, 2019

(54) FUEL CELL

(71) Applicant: NGK INSULATORS, LTD., Nagoya-shi, Aichi (JP)

(72) Inventor: Makoto Ohmori, Nagoya (JP)

(73) Assignee: NGK INSULATORS, LTD., Nagoya-shi, Aichi (JP)

( * ) Notice: Subject to any disclaimer, the term of this patent is extended or adjusted under 35 U.S.C. 154(b) by 0 days.

(21) Appl. No.: 15/846,678

(22) Filed: Dec. 19, 2017

(65) Prior Publication Data
US 2018/0123156 A1    May 3, 2018

Related U.S. Application Data

(63) Continuation of application No. PCT/JP2017/029137, filed on Aug. 10, 2017.

(30) Foreign Application Priority Data

Nov. 1, 2016  (JP) ................................. 2016-214585

(51) Int. Cl.
*H01M 8/1016* (2016.01)

(52) U.S. Cl.
CPC .. *H01M 8/1016* (2013.01); *H01M 2300/0071* (2013.01)

(58) Field of Classification Search
None
See application file for complete search history.

(56) References Cited

U.S. PATENT DOCUMENTS

| | | | |
|---|---|---|---|
| 9,876,235 B2* | 1/2018 | Kobayashi | ............... B32B 18/00 |
| 2013/0095410 A1 | 4/2013 | Ohmori et al. | |
| 2015/0024302 A1* | 1/2015 | Kobayashi | ............... B32B 18/00 |
| | | | 429/489 |
| 2015/0349349 A1 | 12/2015 | Ohmori et al. | |

(Continued)

FOREIGN PATENT DOCUMENTS

| | | |
|---|---|---|
| JP | 2006-032132 A | 2/2006 |
| JP | 2015-038856 A | 2/2015 |

(Continued)

OTHER PUBLICATIONS

International Search Report for PCT/JP2017/029137 (8 pgs).

(Continued)

*Primary Examiner* — Tracy M Dove
(74) *Attorney, Agent, or Firm* — Flynn Thiel, P.C.

(57) ABSTRACT

The fuel cell has an anode, a cathode, and a solid electrolyte layer. The cathode contains a main component containing a perovskite oxide of the general formula $ABO_3$ and includes at least Sr at the A site. The solid electrolyte layer is disposed between the anode and the cathode. The cathode has a surface region and an inner region. The surface region is within 5 μm from a surface opposite the solid electrolyte layer. The inner region is formed on a solid electrolyte layer side of the surface region. The surface region and the inner region respectively include a main phase containing the perovskite oxide and a secondary phase containing strontium sulfate. An occupied surface area ratio of the secondary phase in a cross section of the surface region is greater than an occupied surface area ratio of the secondary phase in a cross section of the inner region.

4 Claims, 1 Drawing Sheet

(56) References Cited

U.S. PATENT DOCUMENTS

2017/0025684 A1    1/2017   Fujisaki et al.
2017/0062837 A1    3/2017   Ohmori et al.

FOREIGN PATENT DOCUMENTS

| | | |
|---|---|---|
| JP | 5981065 B1 | 8/2016 |
| JP | 5981066 B1 | 8/2016 |
| WO | WO 2013/054631 A1 | 4/2013 |
| WO | WO 2014/168071 A1 | 10/2014 |
| WO | WO 2018/083856 A1 | 5/2018 |

OTHER PUBLICATIONS

English translation of Notification of Transmittal of Translation of International Preliminary Report on Patentability issued in International Application No. PCT/JP2017/029137, dated May 16, 2019 (1 page).

English translation of International Preliminary Report on Patentability issued in International Application No. PCT/JP2017/029137, dated May 7, 2019 (5 pages).

English translation of International Preliminary Report on Patentability issued in International Application No. PCT/JP2017/029137, dated May 7, 2019 (1 page).

English translation of Written Opinion of the International Searching Authority issued in International Application No. PCT/JP2017/029137, dated Sep. 5, 2017 (4 pages).

\* cited by examiner

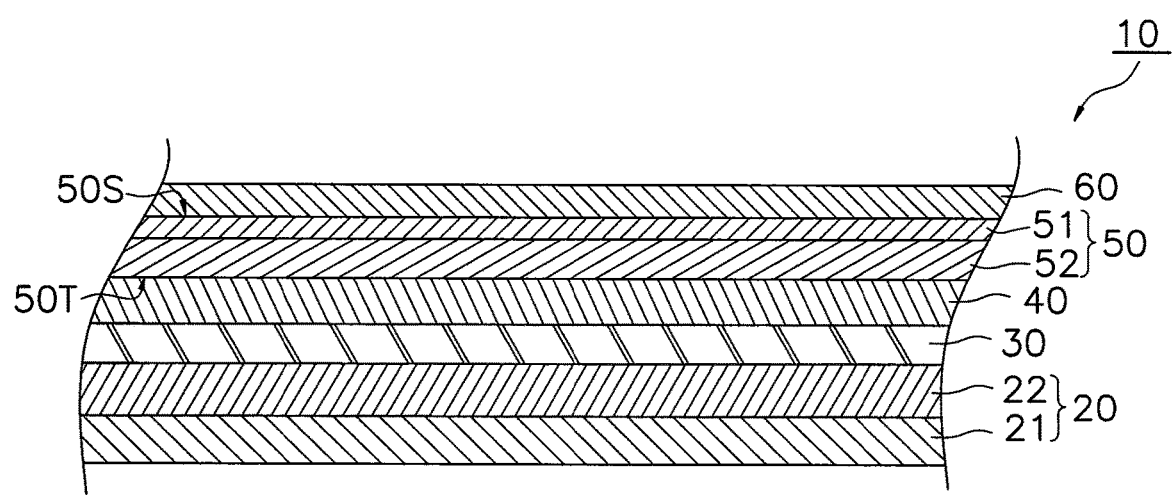

FUEL CELL

CROSS-REFERENCE TO RELATED APPLICATIONS

This application is a continuation application of PCT/JP2017/029137, filed Aug. 10, 2017, which claims priority to Japanese Application No. 2016-214585, filed Nov. 1, 2016, the entire contents all of which are incorporated herein by reference.

TECHNICAL FIELD

The present invention relates to a fuel cell.

BACKGROUND ART

A typical fuel cell is known to include an anode, a cathode, and a solid electrolyte layer disposed between the anode and the cathode.

The material used in the cathode is suitably a perovskite oxide which is expressed by the general formula $ABO_3$ and includes at least Sr at the A site. (For example, reference is made to Japanese Patent Application Laid-Open No. 2006-32132).

SUMMARY OF INVENTION

Technical Problem

However, micro-cracks may form in proximity to the surface of the cathode when the temperature of the cathode falls from a high temperature to a low temperature for example during firing of the cathode or when operation is stopped for a time after commencement of operation of the fuel cell. Although such micro-cracks have no immediate effect on the characteristics of the cathode, during long-term operation of the fuel cell, there is a risk that the micro-cracks will act as a source of the formation of cracks that will have an effect on the cathode. Consequently, there is a need to suppress the formation of micro-cracks in proximity to the surface of the cathode. On the basis of diligent investigations by the present inventors to respond to the above need, new insight has been obtained that the amount of strontium sulfate contained in the cathode is related to the formation of micro-cracks in proximity to the surface of the cathode.

The present invention is proposed based on the new insight above, and has the object of providing a fuel cell that inhibits the formation of cracks in proximity to the surface of the cathode.

Solution to Problem

The fuel cell according to the present invention has an anode, a cathode, and a solid electrolyte layer. The cathode contains a main component configured by a perovskite oxide which is expressed by the general formula $ABO_3$ and includes at least Sr at the A site. The solid electrolyte layer is disposed between the anode and the cathode. The cathode has a surface region and an inner region. The surface region is within 5 μm from a surface opposite the solid electrolyte layer. The inner region is formed on a solid electrolyte layer side of the surface region. The surface region and the inner region respectively include a main phase containing the perovskite oxide and a secondary phase containing strontium sulfate. An occupied surface area ratio of the secondary phase in a cross section of the surface region is greater than an occupied surface area ratio of the secondary phase in a cross section of the inner region.

Advantageous Effects of Invention

The present invention provides a fuel cell that inhibits the formation of cracks in the surface in proximity to the cathode.

BRIEF DESCRIPTION OF DRAWINGS

FIG. 1 is a cross sectional view illustrating a configuration of a fuel cell according to an embodiment.

DESCRIPTION OF EMBODIMENTS

An embodiment of the present invention will be described below making reference to the figures. Those aspects of configuration in the following description of the figures that are the same or similar are denoted by the same or similar reference numerals. However, the figures are merely illustrative, and the actual ratios or the like of the respective dimensions may differ.

Configuration of Fuel Cell 10

The configuration of the fuel cell 10 will be described making reference to the drawings. The fuel cell 10 is configured as a so-called solid oxide fuel cell (SOFC). The possible configurations of the fuel cell 10 include a flat-tubular type, a segmented-in-series type, an anode-supporting type, an electrolyte flat-plate type, a cylindrical type n, or the like.

FIG. 1 is a cross sectional view illustrating a configuration of a fuel cell 10. The fuel cell 10 includes an anode 20, a solid electrolyte layer 30, a barrier layer 40, a cathode 50 and a current collecting layer 60.

The anode 20 functions as the anode for the fuel cell 10. As illustrated in FIG. 1, the anode 20 includes an anode current collecting layer 21 and an anode active layer 22.

The anode current collecting layer 21 is configured as a porous body that exhibits superior gas permeability. The constituent material configuring the anode current collecting layer 21 includes a material that is used in the anode current collecting layer of a conventional SOFC, and for example, includes NiO (nickel oxide)-BYSZ (8 mol % of yttria-stabilized zirconia), or NiO—$Y_2O_3$ (yttria). When NiO is included in the anode current collecting layer 21, at least a portion of the NiO may be reduced to Ni during operation of the fuel cell 10. The thickness of the anode current collecting layer 21 may be configured for example as 0.1 mm to 5.0 mm.

The anode active layer 22 is disposed on the anode current collecting layer 21. The anode active layer 22 is configured as a porous body that is denser than the anode current collecting layer 21. The constituent material for the anode active layer 22 includes a material used in an anode active layer of a conventional SOFC, and for example, includes NiO-8YSZ. When NiO is included in the anode active layer 22, at least a portion of the NiO may be reduced to Ni during operation of the fuel cell 10. The thickness of the anode active layer 22 may be configured for example as 5.0 μm to 30 μm.

The solid electrolyte layer 30 is disposed between the anode 20 and the cathode 50. The solid electrolyte layer 30 in the present embodiment is sandwiched between the anode 20 and the barrier layer 40. The solid electrolyte layer 30 functions to enable permeation of oxygen ions that are produced by the cathode 50. The solid electrolyte layer 30 comprises a material that is denser that the anode 20 and the cathode 50.

The solid electrolyte layer 30 may contain $ZrO_2$ (zirconia) as a main component. In addition to zirconia, the solid electrolyte layer 30 may contain an additive such as $Y_2O_3$ (yttria) and/or $Sc_2O_3$ (scandium oxide). These additives function as a stabilizing agent. The mol composition ratio (stabilizing agent:zirconia) of the stabilizing agent to zirconia in the solid electrolyte layer 30 may be approximately 3:97~20:80. Therefore the material used in the solid electrolyte layer 30 includes 3YSZ, 8YSZ, 10YSZ, or ScSZ (zirconia stabilized with scandia), or the like. The thickness of the solid electrolyte layer 30 for example may be 3 µm to 30 µm.

In the present embodiment, the term composition X "contains as a main component" composition Y means that composition Y preferably occupies at least 70 wt % of the total of composition X, and more preferably occupies at least 90 wt %.

The barrier layer 40 is disposed between the solid electrolyte layer 30 and the cathode 50. The barrier layer 40 inhibits the formation of a high resistivity layer between the solid electrolyte layer 30 and the cathode 50. The barrier layer 40 comprises a material that is denser that the anode 20 or the cathode 50. The barrier layer 40 may include a main component of a ceria-based material such as GDC (gadolinium-doped ceria), SDC (samarium-doped ceria), or the like. The thickness of the barrier layer 40 may, for example, 3 µm to 20 µm.

The cathode 50 is disposed on the barrier layer 40. The cathode 50 functions as a cathode for the fuel cell 10. The cathode 50 is configured as a porous body. The cathode 50 contains a main component comprising a perovskite oxide which is expressed by the general formula $ABO_3$ and includes at least one of La or Sr at the A site. This type of perovskite oxide includes $(LaSr)(CoFe)O_3$: (lanthanum strontium cobalt ferrite), $(La, Sr) FeO_3$: (lanthanum strontium ferrite), $(La, Sr)CoO_3$: (lanthanum strontium cobaltite), $La(Ni, Fe)O_3$: (lanthanum nickel ferrite), $(La, Sr) MnO_3$: (lanthanum strontium manganate), or the like. However, there is no limitation in this regard.

The content ratio of the perovskite oxide in the cathode 50 is greater than or equal to 70 wt %. The content ratio of the perovskite oxide in the cathode 50 is preferably greater than or equal to 90 wt %.

The cathode 50 has a first surface 50S (an example of "a surface") and a second surface 50T. The first surface 50S is a surface that is opposite to the solid electrolyte layer 30. In the present embodiment, since the fuel cell 10 includes the current collecting layer 60, the cathode 50 makes contact with the current collecting layer 60 at the first surface 50S. That is to say, in the present embodiment, the first surface 50S is the interface between the cathode 50 and the current collecting layer 60. The second surface 50T is the surface on the solid electrolyte layer 30 side. In the present embodiment, since the fuel cell 10 includes the barrier layer 40, the cathode 50 makes contact with the barrier layer 40 at the second surface 50T. That is to say, in the present embodiment, the second surface 50T is the interface between the cathode 50 and the barrier layer 40.

The current collecting layer 60 is disposed on the cathode 50 (surface region 51). Although there is no particular limitation in relation to the thickness of the current collecting layer 60, it may be 30 µm to 500 µm. The current collecting layer 60 can comprise the perovskite composite oxide expressed by the composition formula (1) below. However, there is no limitation in this regard. The material used in the current collecting layer 60 is preferably a material that exhibits a smaller electrical resistance than the material used in the cathode 50.

$$La_m(Ni_{1-x-y}Fe_xCu_y)_nO_{3-\delta} \quad (1)$$

A substance other than La may be contained in the A site of composition formula (1), and a substance other than Ni, Fe or Cu may be contained in the B site. In composition formula (1), m and n are greater than or equal to 0.95 and less than or equal to 1.05, x(Fe) is greater than or equal to 0.03 and less than or equal to 0.3, y(Cu) is greater than or equal to 0.05 and less than or equal to 0.5, and δ is greater than or equal to 0 and less than or equal to 0.8.

Configuration of Cathode 50

The cathode 50 includes a surface region 51 and an inner region 52. The surface region 51 is disposed on the inner region 52. The surface region 51 is a region within 5 µm from the first surface 50S. The inner region 52 is disposed on the solid electrolyte layer 30 side of the surface region 51. In the present embodiment, the inner region 52 is disposed between the surface region 51 and the barrier layer 40. The thickness of the inner region 52 in the direction of thickness may be 5 µm to 300 µm.

The first surface 50S may be determined based on a line of rapid change in a concentration distribution of a predetermined component when mapping the component concentration in a cross section that is parallel to the direction of thickness in the cathode 50 and the current collecting layer 60. More specifically, the first surface 50S is taken to be the line at which the concentration of an element that is substantially included in only one of the cathode 50 or the current collecting layer 60 takes a value of 10% of the maximum concentration in an inner portion of that component. The second surface 50T may be determined based on a line of rapid change in the concentration distribution of a predetermined component when mapping the component concentration in a cross section that is parallel to the direction of thickness in the barrier layer 40 and the cathode 50. More specifically, the second surface 50T is taken to be the line at which the concentration of an element that is substantially included in only one of the barrier layer 40 or the cathode 50 takes a value of 10% of the maximum concentration in an inner portion of that component.

The surface region 51 contains a main phase of a perovskite oxide that is expressed by the general formula $ABO_3$ as disclosed above and includes at least Sr at the A site. The occupied surface area ratio of the main phase that comprises the perovskite oxide in the cross section of the surface region 51 may be greater than or equal to 91% and less than or equal to 99.5%. In the present embodiment, the term "occupied surface area ratio of the substance Z in the cross section" denotes the ratio of the sum total surface area of a substance Z relative to the total surface area that includes the pores and the solid phase. The method of calculating the occupied surface area ratio will be described in detail below.

The surface region 51 contains strontium sulfate ($SrSO_4$) as a secondary phase. The occupied surface area ratio of the secondary phase configured by $SrSO_4$ in the cross section of the surface region 51 is greater than the occupied surface area ratio of the secondary phase in a cross section of the inner region 52 as discussed below. In this manner, since the strength of the porous structure of the surface region 51 is enhanced, it is possible to inhibit the formation of microcracks in the surface region 52.

The occupied surface area ratio of the secondary phase in the cross section of the surface region 51 may be configured as greater than or equal to 0.2% and less than or equal to 10%, and is preferably greater than or equal to 0.25% and less than or equal to 8.5%. In this manner, it is possible to inhibit the formation of micro-cracks in the surface region 52, and since there is a reduction in the inactive region that is present in the surface region 51, it is possible to inhibit a reduction in the characteristics of the cathode.

The average equivalent circle diameter of the secondary phase in the cross section of the surface region 51 may be configured as greater than or equal to 0.03 µm and less than or equal to 3.2 µm, and is preferably greater than or equal to 0.05 µm and less than or equal to 2.0 µm. In this manner, even when the temperature of the cathode repeatedly rises and falls, it is possible to inhibit micro-cracks that are produced in the surface region 51 from advancing towards the solid electrolyte layer 30.

In the present embodiment, the equivalent circle diameter is the diameter of a circle that has the same surface area as the secondary phase in an image of a field emission scanning electron microscope (FE-SEM). The average equivalent circle diameter is the value of the arithmetic average of 20 equivalent circle diameters for the secondary phase that are randomly selected. The 20 secondary phase samples that are the object of equivalent circle diameter measurement are preferably selected in a random manner from 5 or more positions on an electron backscattered image.

The constituent elements (for example, La, Co, or the like) in the main phase may be in a solid solution in the secondary phase of the surface region 51. Furthermore, the secondary phase of the surface region 51 may include a minute amount of impurities in addition to $SrSO_4$.

In addition to the main phase and the secondary phase, the surface region 51 may include a third phase comprising at least one of a third phase comprising a perovskite oxide (for example, $LaCoO_3$, or the like) that is expressed by the general formula $ABO_3$ and is different from that used in the main phase, or an oxide of the constituent elements of the main phase, or the like. The oxide of the constituent elements of the main phase includes for example SrO, (Co, Fe)$_3$O$_4$, and Co$_3$O$_4$ or the like. (Co, Fe)$_3$O$_4$ includes Co$_2$FeO$_4$, Co$_{1.5}$Fe$_{1.5}$O$_4$, and CoFe$_2$O$_4$, or the like. The occupied surface area ratio of the third phase in the cross section of the surface region 51 may be less than or equal to 0.3%.

The inner region 52 includes a main phase comprising a perovskite oxide that is expressed by the general formula $ABO_3$ as disclosed above and includes at least Sr at the A site. The occupied surface area ratio of the main phase in a cross section of the inner region 52 is greater than or equal to 91%.

The inner region 52 includes a secondary phase comprising strontium sulfate. In this manner, since the strength of the porous structure of the inner region 52 is enhanced, even when micro-cracks form in the surface region 51, it is possible to inhibit those micro-cracks from advancing towards the solid electrolyte layer 30. Furthermore, the occupied surface area of the secondary phase in the cross section of the inner region 52 is smaller than the occupied surface area of the secondary phase in the cross section of the inner region 51. In this manner since there is a reduction in the inactive region that is present in the inner region 52, it is possible to inhibit a reduction in the characteristics of the cathode.

The occupied surface area ratio of the secondary phase in the cross section of the inner region 52 may be greater than or equal to 0.05% and less than or equal to 3%, and is preferably greater than or equal to 0.1% and less than or equal to 2.5%. In this manner, it is possible to inhibit micro-cracks produced in the surface region 51 from advancing towards the solid electrolyte layer 30 and thereby inhibit a reduction in the characteristics of the cathode.

The average equivalent circle diameter of the secondary phase in a cross section of the inner region 52 may be greater than or equal to 0.02 µm and less than or equal to 2.6 µm, and is preferably greater than or equal to 0.05 µm and less than or equal to 2.0 µm. In this manner, even when the temperature of the cathode repeatedly rises and falls, it is possible to inhibit micro-cracks that are produced in the surface region 51 from advancing towards the solid electrolyte layer 30. The method of calculating the average equivalent circle diameter of the secondary phase in a cross section of the inner region 52 is the same as the method of calculating the average equivalent circle diameter of the secondary phase in a cross section of the surface region 51 as discussed above.

The constituent elements (for example, La, Co, or the like) of the main phase may be in a solid solution in the secondary phase of the inner region 52. Furthermore, the secondary phase of the inner region 52 may include a minute amount of impurities in addition to $SrSO_4$.

In addition to the main phase and the secondary phase, the inner region 52 may include at least one of a third phase comprising a perovskite oxide (for example, $LaCoO_3$, or the like) that is expressed by the general formula $ABO_3$ and is different from that used in the main phase, and a third phase comprising an oxide of the constituent elements of the main phase, or the like.

Method of Calculation of Occupied Surface Area

Now, the method of calculation of the occupied surface area ratio of the secondary phase in a cross section of the surface region 51 will be described below. In the following description, although a method of calculation of the occupied surface area ratio of the secondary phase will be described with reference to a cross section of the surface region 51, the occupied surface area ratio of the secondary phase in a cross section of the inner region 52 may be calculated in the same manner. Furthermore, the same calculation may be performed in relation to the occupied surface area ratio of the main phase and the third phase in the respective cross sections of the surface region 51 and the inner region 52.

(1) FE-SEM Image

Firstly, a backscattered electron image showing a cross section of the surface region 51 enlarged with a magnification of 10,000 times is obtained by FE-SEM using a backscattered electron detector. The backscattered electron image is obtained by an FE-SEM (model: ULTRA55) manufactured by Zeiss AG (Germany) with a working distance setting of 2 mm, and an acceleration voltage of 1.5 kV. The cross section of the surface region 51 is preprocessed by polishing with precision machinery followed by an ion milling process performed using an IM4000 manufactured by Hitachi High-Technologies Corporation.

In the backscattered electron image, there are different contrasts for the main phase (LSCF), the secondary phase ($SrSO_4$) and the pores. The main phase is displayed as "faint gray", the secondary phase as "gray" and the pores as "black". In this manner, 3 values assigned in relation to the contrast can be realized by categorizing the luminosity of the image into 256 gradations.

There is no limitation in relation to the method of discriminating the main phase, the secondary phase and the pores by use of contrast in the backscattered electron image. For example, after obtaining an element mapping image in the same field by use of scanning electron microscope energy dispersive X-ray spectrometry (SEM-EDS), accurate discrimination of the main phase, the secondary phase and the pores is possible by making reference to the backscattered electron image and identifying respective particles in the image.

(2) Analysis of Backscattered Electron Image

Next, an image for analysis of the backscattered electron image using HALCON image analysis software produced by MVTec GmbH (Germany) is obtained.

(3) Calculation of Occupied Surface Area

The total surface area of the secondary phase in the white areas is calculated with reference to the acquired analysis image. Next, the proportion of the total surface area of the secondary phase relative to the surface area (including the pores and the solid phase) in the whole backscattered electron image is calculated. The proportion of the total surface area of the secondary phase calculated in this manner is taken to be the occupied surface area ratio of the secondary phase in the surface region 51.

Material of Surface Region 51 and Inner Region 52 The cathode material used to make the surface region 51 and the inner region 52 is a mixture including a main component containing a perovskite oxide and a secondary component of $SrSO_4$.

It is possible to separately adjust the occupied surface area ratio of the secondary phase respectively in the surface region 51 and the inner region 52 by adjusting the addition amount of the material powder that contains $SrSO_4$.

Adjusting the particle size of the material powder containing $SrSO_4$ enables an adjustment of the average equivalent circle diameter of the secondary phase respectively in the surface region 51 and the inner region 52. An accurate classification that includes an upper limiting value and a lower limiting value is possible by the use of an air classifier to adjust the grain size of the material powder containing $SrSO_4$. When the particle size of the material powder containing $SrSO_4$ is configured to have "a coarse grain size" and/or "a large grain size distribution," the average equivalent circle diameter of the secondary phase can be configured to be large, and conversely, when the particle size is configured to have "a fine grain size" and/or "a small grain size distribution," the average equivalent circle diameter of the secondary phase can be configured to be small.

Method of Manufacturing Fuel Cell 10

Next, an example will be described of a manufacture method for the fuel cell 10.

Firstly, a green body for the anode current collecting layer 21 is formed by molding an anode current collecting layer material powder using a die press molding method.

Then, a slurry for the anode active layer is formed by adding PVA (polyvinyl alcohol) as a binder to a mixture of a pore forming agent (for example, PMMA) and the anode active layer material powder. The slurry for the anode active layer is printed onto the green body of the anode current collecting layer 21 using a printing method or the like to thereby form a green body for the anode active layer 22. The green body for the anode 20 is formed as described above.

Next, a slurry for the solid electrolyte layer is prepared by mixing terpineol and a binder with a solid electrolyte layer material powder. The slurry for the solid electrolyte layer is coated onto the green body of the anode active layer 22 using a printing method or the like to thereby form a green body for the solid electrolyte layer 30.

Next, a slurry for the barrier layer is prepared by mixing terpineol and a binder with a barrier layer material powder. The slurry for the barrier layer is coated onto the green body of the solid electrolyte layer 30 using a printing method or the like to thereby form a green body for the barrier layer 40.

Next, the green bodies respectively for the anode 20, the solid electrolyte layer 30 and the barrier layer 40 are fired (1350 to 1450° C., 1 to 20 hours) to form the anode 20, the solid electrolyte layer 30 and the barrier layer 40.

Then, a slurry for the inner region is prepared by mixing the material for the inner region 52 as discussed above (a mixed material containing a perovskite oxide material as a main component and $SrSO_4$ as a secondary component), water and a binder in a ball mill for 24 hours. At that time, the occupied surface area ratio of the secondary phase in the inner region 52 after firing may be controlled by adjusting the mixture amount of $SrSO_4$ in the mixed material. In the present embodiment, the mixture amount of $SrSO_4$ is adjusted so that the occupied surface area ratio of the secondary phase in the inner region 52 is smaller than the occupied surface area ratio of the secondary phase in the surface region 51.

Then the slurry for the inner region is coated onto the barrier layer 40 using a printing method or the like to thereby form a green body for the inner region 52.

The material for the surface region 51 as described above (mixed material containing perovskite oxide material as a main component and $SrSO_4$ as a secondary component), water and a binder are mixed in a ball mill for 24 hours to prepare a slurry for the surface region. At that time, the occupied surface area ratio of the secondary phase in the surface region 51 after firing can be controlled by adjusting the mixed amount of $SrSO_4$ in the mixed material. In the present embodiment, the mixture amount of $SrSO_4$ is adjusted so that the occupied surface area ratio of the secondary phase in the surface region 51 is greater than the occupied surface area ratio of the secondary phase in the inner region 52.

Then the slurry for the surface region is coated onto the green body for the inner region 52 to thereby form a green body for the surface region 51.

Then water and a binder are added to the material for the current collecting layer 60 as described above, and mixed to prepare a slurry for the current collecting layer.

Then the slurry for the current collecting layer is coated onto the green body for the surface region 51 to thereby form a green body for the current collecting layer 60.

The green bodies for the inner region 52, the surface region 51 and the current collecting layer 60 are fired (1000 to 1100° C., 1 to 10 hours) to form the cathode 50 and the current collecting layer 60.

Other Embodiments

The present invention is not limited to the above embodiment, and various changes or modifications may be added within a scope that does not depart from the scope of the invention.

Although the fuel cell 10 includes the current collecting layer 60, the current collecting layer 60 may be omitted. In this configuration, the first surface 50S of the cathode 50 becomes the outer surface of the fuel cell 10, and the surface region 51 of the cathode 50 becomes the region that is within 5 μm of the outer surface.

Although the fuel cell 10 includes the barrier layer 40, the barrier layer 40 may be omitted. In this configuration, the second surface 50T of the cathode 50 makes contact with the solid electrolyte layer 30, and therefore the inner region 52 of the cathode 50 becomes sandwiched between the surface region 51 and the solid electrolyte layer 30.

Although the barrier layer 40 is configured with a mono-layer configuration, a laminated structure may be provided in which a dense barrier layer is laminated (randomly) with a porous barrier layer.

Examples

Although the examples of a fuel cell according to the present invention will be described below, the present invention is not thereby limited to the following examples.

Preparation of Samples No. 1 to No. 14

A fuel cell according to Samples No. 1 to No. 14 was prepared as described below.

Firstly, a mixed powder was prepared by drying a slurry of a mixture of IPA and a blended powder of a pore-forming agent (PMMA), $Y_2O_3$ powder and an NiO powder in a nitrogen atmosphere.

Next, uniaxial pressing (compaction pressure 50 MPa) was applied to the mixed powder to form a plate of 30 mm length×30 mm width and a thickness of 3 mm. A green body for the anode current collecting layer was prepared by further consolidation of the plate by use of a CIP (compaction pressure: 100 MPa).

Next, the slurry formed from a mixture of IPA and a blended powder of PMMA and NiO-8YSZ was coated onto the green body for the anode current collecting layer.

Next, a slurry for the solid electrolyte layer was prepared by mixing terpineol and a binder with 8YSZ. Then the slurry for the solid electrolyte layer was coated onto the green body of the anode to thereby form a green body for the solid electrolyte layer.

Then a GDC slurry was prepared, and the GDC slurry was coated onto the green body for the solid electrolyte layer to thereby prepare a green body for the barrier layer.

Next, the green bodies respectively for the anode, the solid electrolyte layer and the barrier layer were fired (1450° C., 5 hours) to form the anode, the solid electrolyte layer and the barrier layer.

Next, an inner region material was prepared by adding a powder of $SrSO_4$ to the perovskite oxide material as shown in Table 1. At that time, the addition amount of $SrSO_4$ was adjusted in each sample so that the occupied surface area ratio of the secondary phase ($SrSO_4$) in the cross section of the inner region takes the values shown in Table 1.

Next, a slurry for the inner region was prepared by mixing terpineol and a binder with the inner region material. The slurry for the inner region was coated onto the barrier layer to thereby prepare a green body for the inner region.

Next, a surface region material was prepared by adding a powder of $SrSO_4$ to the perovskite oxide material powder as shown in Table 1. At that time, the addition amount of $SrSO_4$ was adjusted in each sample so that the occupied surface area ratio of the secondary phase in the cross section of the surface region takes the values shown in Table 1.

Next, a slurry for the surface region was prepared by mixing terpineol and a binder with a surface region material. The slurry for the surface region was coated onto the green body for the inner region to thereby prepare a green body for the surface region. The coating amount at that time was adjusted so that the thickness of the surface region after firing was less than or equal to 5 μm.

Next, in Sample Nos. 2, 5, 7, 8 and 10, a slurry for the current collecting layer was prepared by mixing water and a binder with a current collecting layer powder as shown in Table 1. The slurry for the current collecting layer was coated onto the green body for the surface region to thereby form a green body for the current collecting layer.

Next, the green bodies for the inner region, surface region and current collecting layer (only for Sample Nos. 2, 5, 7, 8 and 10) were fired (1100° C., 1 hour) to form the cathode and current collecting layer.

Measurement of Occupied Surface Area Ratio

After polishing of the cross section of the cathode in each sample with precision machinery, ion milling processing was performed using an IM4000 manufactured by Hitachi High-Technologies Corporation.

A backscatter electron image of the cross section of the surface region enlarged with a magnification of 10,000 times by a FE-SEM using a backscatter electron detector was acquired.

Then, an analysis image was acquired by analyzing the backscatter electron image for each sample using HALCON image analysis software produced by MVTec GmbH.

Then, the proportion of the total surface area of the secondary phase relative to the sum total surface area (including gas phase and solid phase) in the backscatter electron image was calculated as the occupied surface area ratio. The calculation results for the occupied surface area ratio of the secondary phase are shown in Table 1.

Observation of Micro-Cracks after Firing

After firing the cathode in each sample, observation using an electron microscope was performed with reference to 20 positions in a cross section of the surface region to thereby observe the presence or absence of micro-cracks in the surface region after the temperature of the cathode had fallen from a high temperature to a low temperature. The observation results are shown in Table 1.

Observation of Micro-cracks after Heat Cycle Testing

Sample Nos. 3 to 14 were maintained in a reducing atmosphere by supply to the anode of Ar gas and hydrogen gas (4% relative to Ar). Such a cycle was repeated 10 times in which after increasing the temperature over 2 hours from ambient temperature to 800° C., the temperature was allowed to fall to ambient temperature over 4 hours.

Then observation using an electron microscope was performed with reference to a cross section of the surface region and the inner region to thereby observe the presence or absence of cracks advancing from the surface region into the inner region when the temperature of the cathode had repeatedly risen and fallen. The observation results are summarized in Table 1.

TABLE 1

| Sample No. | Main Component of Cathode | Main Component of Current Collecting Layer | Occupied Surface Area Ratio of Secondary Phase in Inner Region of Cathode (%) | Average Equivalent Circle Diameter of Secondary Phase in Inner Region of Cathode (μm) | Occupied Surface Area Ratio of Secondary Phase in Surface Region of Cathode (%) | Average Equivalent Circle Diameter of Secondary Phase in Surface Region of Cathode (μm) | Presence/Absence of Micro-cracks After Firing | Presence/Absence of Cracks After Heating Cycle Testing | Evaluation |
|---|---|---|---|---|---|---|---|---|---|
| 1 | (La, Sr)(Co, Fe)O$_3$ | None | 0.05 | — | 0.03 | — | Yes (3/20) | — | X |
| 2 | (La, Sr)(Co, Fe)O$_3$ | La(Ni, Fe, Co)O$_3$ | 0.05 | — | 0.05 | — | Yes (2/20) | — | X |
| 3 | (La, Sr)(Co, Fe)O$_3$ | None | 0.1 | 0.02 | 0.25 | 0.03 | None (0/20) | Slight (1/20) | ○ |
| 4 | (La, Sr)(Co, Fe)O$_3$ | None | 0.16 | 0.05 | 0.48 | 0.05 | None (0/20) | None (0/20) | ◎ |
| 5 | (La, Sr)FeO$_3$ | La(Ni, Fe, Co)O$_3$ | 0.25 | 0.12 | 0.85 | 0.45 | None (0/20) | None (0/20) | ◎ |
| 6 | (La, Sr)(Co, Fe)O$_3$ | None | 0.36 | 0.32 | 1.3 | 0.05 | None (0/20) | None (0/20) | ◎ |
| 7 | (La, Sr)FeO$_3$ | (La, Sr)(Co, Fe)O$_3$ | 0.45 | 0.45 | 1.4 | 0.32 | None (0/20) | None (0/20) | ◎ |
| 8 | (La, Sr)(Co, Fe)O$_3$ | La(Ni, Fe, Co)O$_3$ | 0.66 | 0.76 | 1.9 | 0.14 | None (0/20) | None (0/20) | ◎ |
| 9 | (La, Sr)(Co, Fe)O$_3$ | None | 0.85 | 1.3 | 2.9 | 0.62 | None (0/20) | None (0/20) | ◎ |
| 10 | (La, Sr)(Co, Fe)O$_3$ | La(Ni, Fe, Co)O$_3$ | 1.2 | 2.0 | 3.9 | 2.0 | None (0/20) | None (0/20) | ◎ |
| 11 | (Sm, Sr)CoO$_3$ | None | 1.6 | 1.2 | 4.4 | 1.3 | None (0/20) | None (0/20) | ◎ |
| 12 | (La, Sr)(Co, Fe)O$_3$ | None | 2.2 | 2.0 | 5.2 | 1.5 | None (0/20) | None (0/20) | ◎ |
| 13 | (La, Sr)(Co, Fe)O$_3$ | None | 2.5 | 2.6 | 8.5 | 3.2 | None (0/20) | Slight (1/20) | ○ |
| 14 | (La, Sr)(Co, Fe)O$_3$ | None | 3.3 | — | 1.6 | — | Yes (1/20) | Yes (3/20) | X |

As shown in Table 1, micro-crack formation in the surface region as a result of a falling temperature after firing of the cathode was suppressed in those samples in which the occupied surface area ratio of the secondary phase in the surface region is greater than the occupied surface area ratio of the secondary phase in the inner region. This feature is due in particular to the enhancement in the strength of the porous structure of the surface region in the cathode.

In particular, it was confirmed that the formation of micro-cracks in the surface region was inhibited in those samples in which the occupied surface area ratio of the secondary phase in the surface region in the present embodiment is greater than or equal to 0.25% and less than or equal to 8.5%.

Furthermore, as shown in Table 1, after heat cycle testing, that is to say, even when the temperature of the cathode repeatedly rises and falls, it was possible to inhibit advancement of cracks from the surface region into the inner region in those samples in which the average equivalent circle diameter of the secondary phase in the surface region is greater than or equal to 0.05 μm and less than or equal to 2.0 μm, and the average equivalent circle diameter of the secondary phase in the inner region is greater than or equal to 0.05 μm and less than or equal to 2.0 μm.

What is claimed is:

1. A fuel cell comprising:
   an anode;
   a cathode containing a perovskite oxide of formula (1) as a main component, $$ABO_3 \qquad (1)$$

wherein A includes at least Sr and B includes at least one element selected from the group consisting of Fe, Co, Mn and Ni, and
   a solid electrolyte layer disposed between the anode and the cathode,
   wherein the cathode has a surface region which extends 5 μm inwardly from a surface thereof opposite the solid electrolyte layer and an inner region formed on a solid electrolyte layer side of the surface region, the surface region and the inner region respectively containing a main phase comprising the perovskite oxide and a secondary phase comprising strontium sulfate and an occupied surface area ratio of the secondary phase in a cross section of the surface region taken parallel to a thickness direction of the cathode is greater than an occupied surface area ratio of the secondary phase in a cross section of the inner region taken parallel to a thickness direction of the cathode.

2. The fuel cell according to claim 1, wherein the occupied surface area ratio of the secondary phase in the cross section of the surface region is greater than or equal to 0.25% and less than or equal to 8.5%.

3. The fuel cell according to claim 1, wherein
   an average equivalent circle diameter of the secondary phase in the cross section of the surface region is greater than or equal to 0.05 μm and less than or equal to 2.0 μm, and
   an average equivalent circle diameter of the secondary phase in the cross section of the inner region is greater than or equal to 0.05 μm and less than or equal to 2.0 μm,
   the average equivalent circle diameter being a value of an arithmetic average of equivalent circle diameters for the secondary phase.

4. The fuel cell according to claim 1, further comprising;
   a current collecting layer disposed on the surface region of the cathode.

* * * * *

UNITED STATES PATENT AND TRADEMARK OFFICE
CERTIFICATE OF CORRECTION

| | | |
|---|---|---|
| PATENT NO. | : 10,411,282 B2 | Page 1 of 1 |
| APPLICATION NO. | : 15/846678 | |
| DATED | : September 10, 2019 | |
| INVENTOR(S) | : Makoto Ohmori | |

It is certified that error appears in the above-identified patent and that said Letters Patent is hereby corrected as shown below:

On the Title Page

Change:
"(72) Inventor: Makoto Ohmori, Nagoya (JP)"
To:
---(72) Inventor: Makoto Ohmori, Nagoya-shi, Aichi (JP)---

Signed and Sealed this
Nineteenth Day of November, 2019

Andrei Iancu
*Director of the United States Patent and Trademark Office*